Aug. 9, 1960
E. BONAMI
2,948,093
METHOD AND APPARATUS FOR ASSEMBLING CYLINDRICAL OBJECTS
Filed June 24, 1957
4 Sheets-Sheet 1
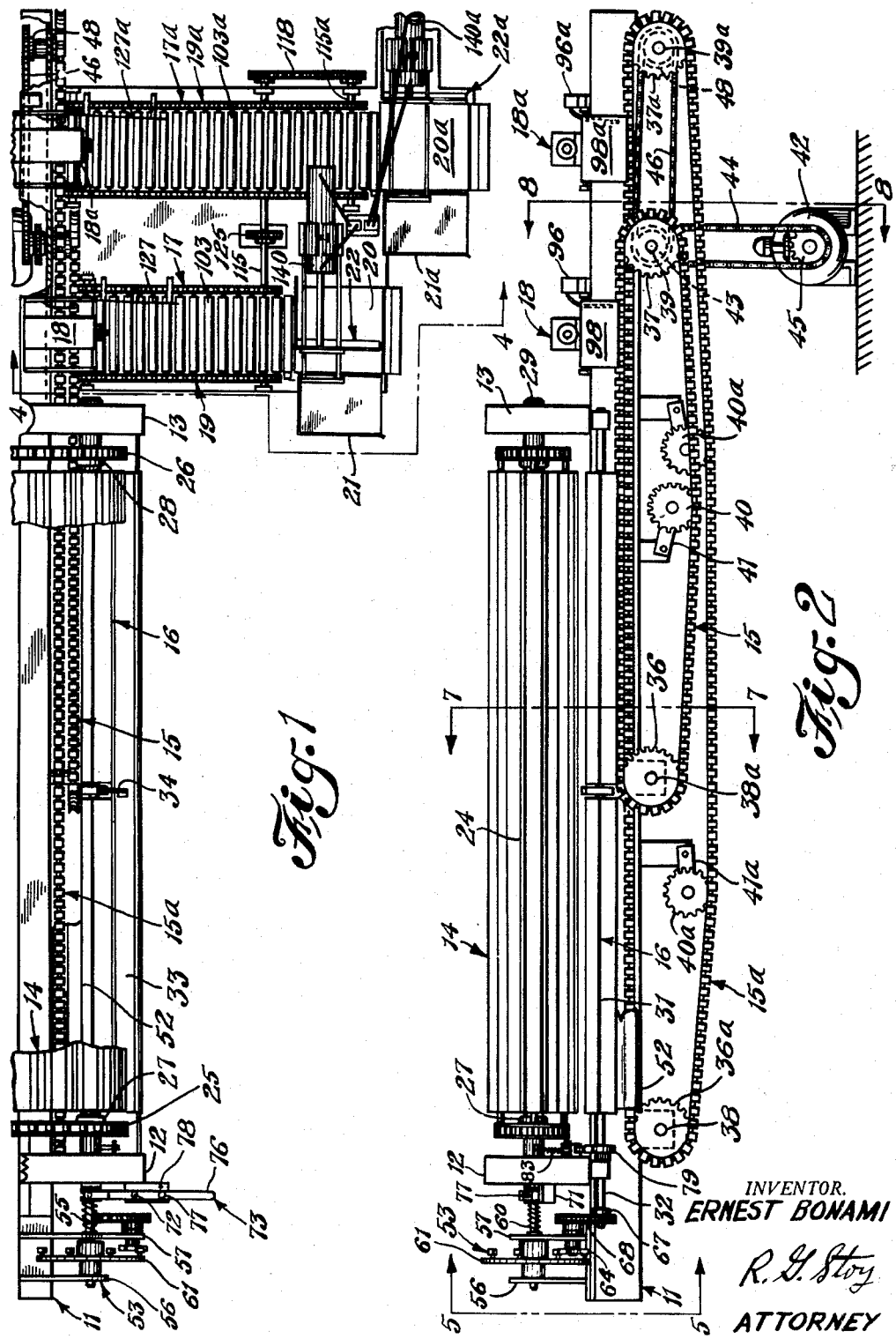
INVENTOR.
ERNEST BONAMI
R. G. Story
ATTORNEY Aug. 9, 1960 E. BONAMI 2,948,093
METHOD AND APPARATUS FOR ASSEMBLING CYLINDRICAL OBJECTS
Filed June 24, 1957 4 Sheets-Sheet 2

INVENTOR.
ERNEST BONAMI
BY
R. G. Story
ATTORNEY

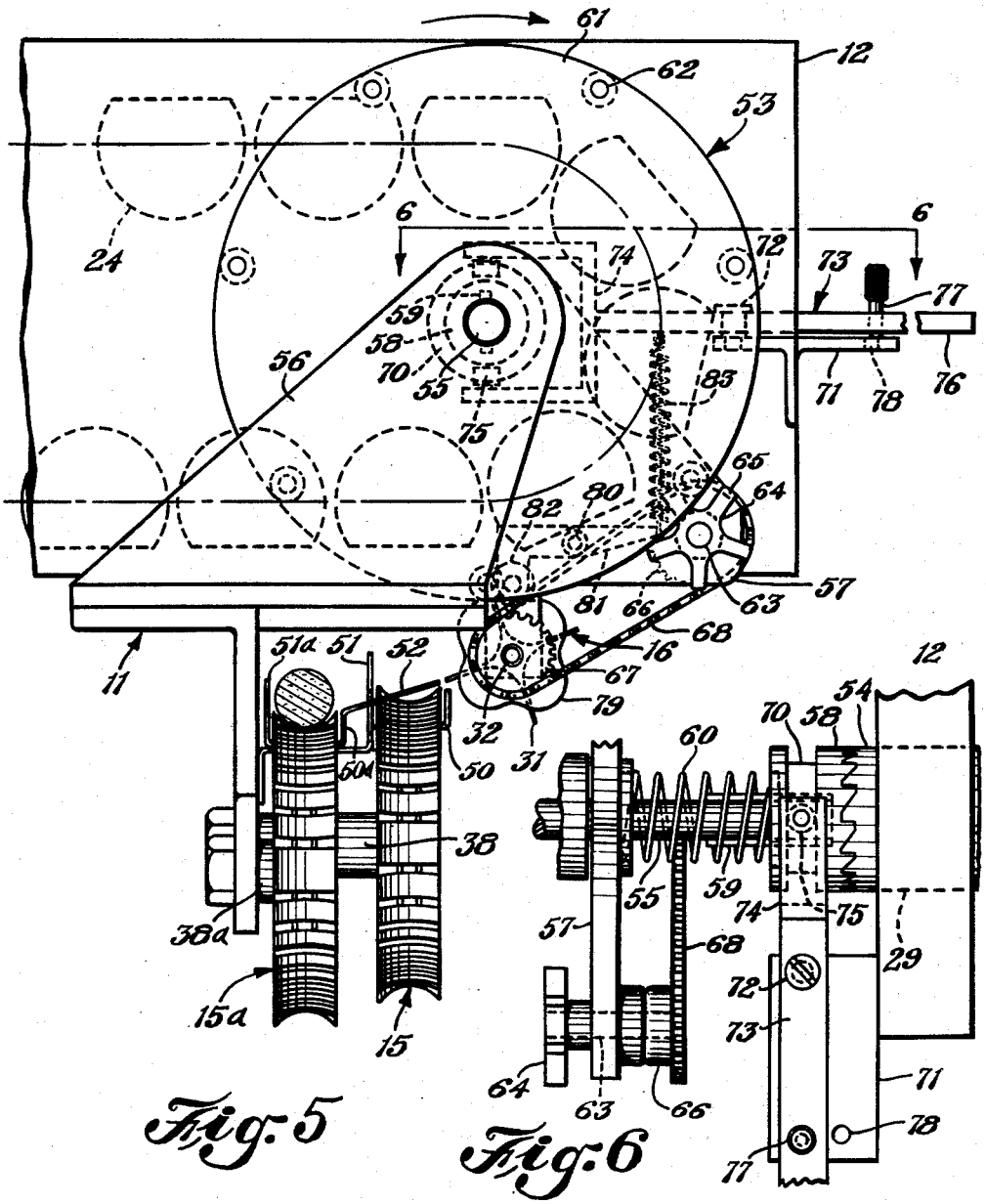

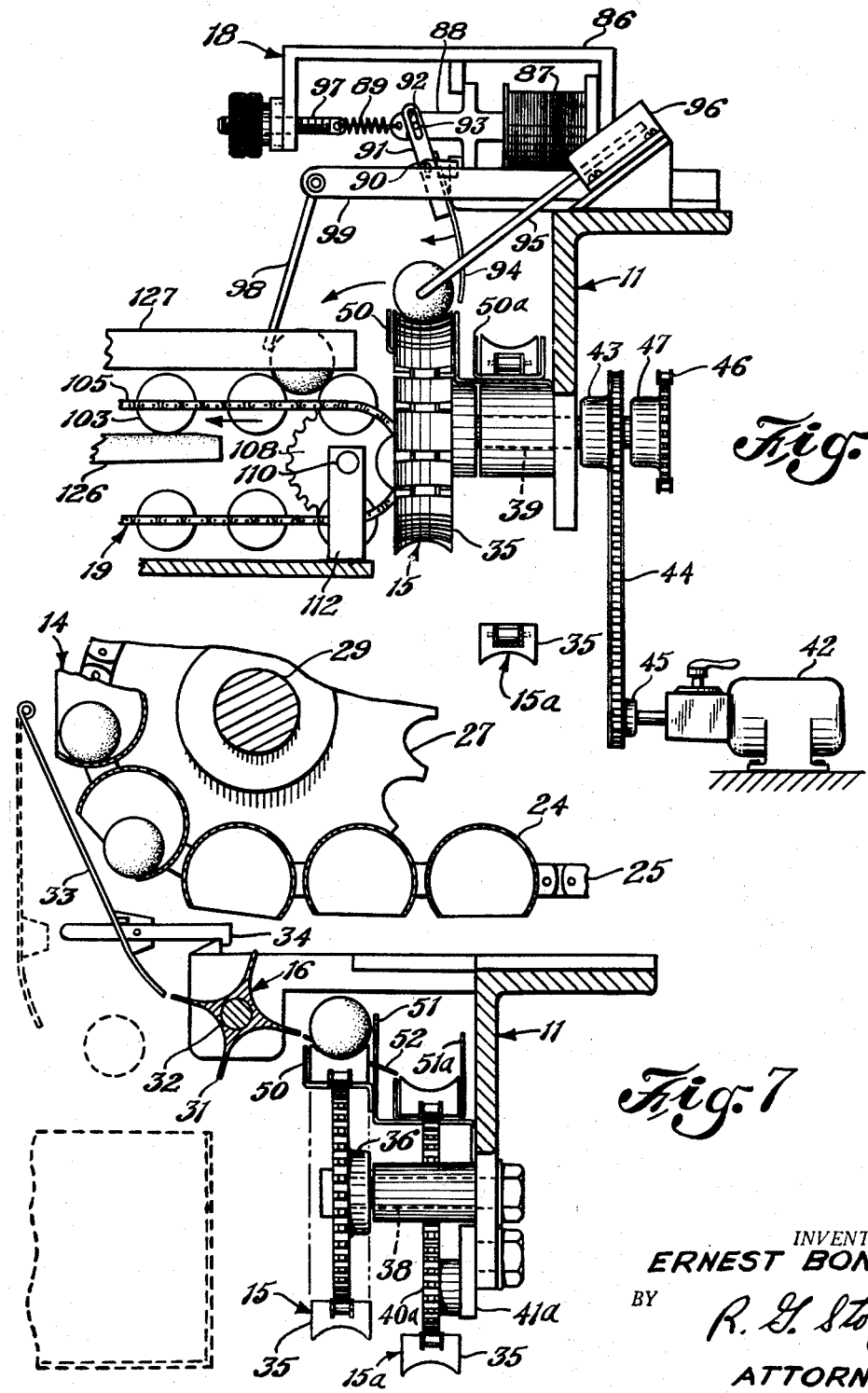

United States Patent Office 2,948,093
Patented Aug. 9, 1960

2,948,093

METHOD AND APPARATUS FOR ASSEMBLING CYLINDRICAL OBJECTS

Ernest Bonami, Chicago, Ill., assignor to Swift & Company, Chicago, Ill., a corporation of Illinois Filed June 24, 1957, Ser. No. 667,389

15 Claims. (Cl. 53—26)

The present invention relates to a method and apparatus for transporting generally cylindrical objects from a conveyor on which the objects are moving and assembling those objects into aligned groups for insertion into a container.

The method and apparatus are adaptable for use with a machine for manufacturing skinless frankfurters wherein a semi-fluid meat-containing frankfurter mix is set up into the form of frankfurters in a fixed mold in a molding head, and the formed frankfurters are dropped into a basket on a conveyor. The basket and its contents are transported through smoking and cooking apparatus to complete the manufacture of the frankfurters. A number of molding heads are used in parallel, discharging into elongated baskets so that each basket contains a plurality of generally aligned frankfurters. The present method and apparatus involves the removing of the frankfurters from the baskets, assembling them into groups of a given number of aligned frankfurters, and depositing each group into a cardboard tray which may be subsequently wrapped in a transparent film to complete the package.

Some of the requirements of the method and apparatus of the present invention are as follows:

(a) The timing of the conveyor from which the frankfurters are taken must be such that a basket containing the purality of frankfurters (eight frankfurters in the described embodiment) will arrive at the correct intervals at any given point along the conveyor. For example, the handling processes must be such that the apparatus will handle the plurality of frankfurters and get them out of the way at the proper time.

(b) The baskets should contain about the same number of frankfurters, and the frankfurters should be in approximately the same position in the baskets. The automatic machinery employed to form the frankfurters and put them in the baskets should be free from breakdown or malfunction of the molding heads which would result in varying greatly the number of frankfurters in the baskets.

(c) If malformed frankfurters which should not be packaged are produced, provision is necessary for a visual inspection of all surfaces of all of the frankfurters so that any substandard product can be eliminated. This inspection should take place with the frankfurters in a relatively small area so that the number of inspectors can be kept to a minimum; yet the inspection takes place at a time before the frankfurters had been grouped for packaging so that if a frankfurter were removed, it would not upset the grouping.

(d) In the removing of the frankfurters from the baskets by inverting the basket by moving the chains supporting the baskets about a sprocket, the frankfurters should fall from the baskets at approximately the same time, or the time interval between the first frankfurter and the last frankfurter to fall out should not be great.

The principal object of the present invention is to provide a method and apparatus that will meet the foregoing requirements, and transfer the frankfurters from the conveyor on which they have been made to a tray in groups of a given number of frankfurters. With my invention, only one inspector is needed for a manufacturing unit delivering a maximum of 8 frankfurters in a basket every 4 seconds. One worker can inspect the frankfurters and see that there are no defects therein and remove the frankfurters in which defects are found. The removal of any such frankfurters causes no disruption of the process.

With the disclosed apparatus only one additional person is needed to position the empty trays and remove the filled trays from the machine; but it will be readily apparent to one skilled in the art that the apparatus is readily adaptable for the use of automatic conveyors to replace this latter person. While the specific embodiment described was devised for the purpose indicated, it will be readily apparent that the method and apparatus will find application in other fields where similar problems occur.

Other objects and advantages will become apparent from the following description taken in conjunction with the drawings in which:

Figure 1 is a plan view of an embodiment of the invention with portions broken away for better illustrating the structure;

Figure 2 is an elevation with the curved chute, roller conveyors, and grouping and carton filling apparatus removed;

Figure 5 is a partial end view, on an enlarged scale, taken at line 5—5 of Figure 2;

Figure 6 is a partial plan view taken at line 6—6 of Figure 5;

Figure 7 is a partial section, on an enlarged scale, taken at line 7—7 of Figure 2; and Figure 8 is a section taken at line 8—8 of Figure 2, on an enlarged scale, showing in addition the adjacent end of the roller conveyor.

Figure 4:
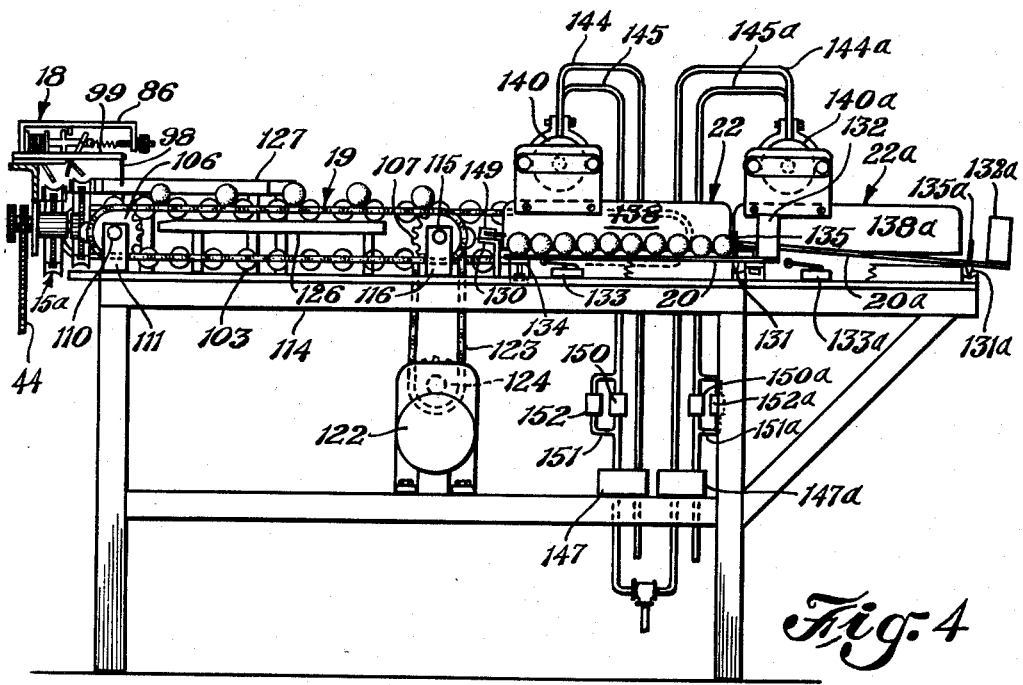
Figure 4 is a section, on an enlarged scale, taken at line 4—4 of Figure 1.

In accordance with the invention, the frankfurters are removed from the manufacturing machine and positioned end to end in an aligned axial relationship in baskets. The baskets are inverted and the frankfurters are held stationary in the desired aligned relationship for a period of time sufficient to insure that all of the frankfurters have dropped from the baskets. The frankfurters are then rapidly conveyed along a path parallel to the cylindrical axis of the frankfurters while maintaining the aligned relationship. At a given point along this path the frankfurters are sequentially moved in a direction substantially at right angles to the path and are then conveyed along a second path so disposed. In doing this the initial alignment of the frankfurters is maintained. Any misalignment that might occur in moving from the first path to the second is corrected. At a given point along the second path the frankfurters are assembled into a group of a given number, preferably by stopping a first frankfurter at a point along the second path while continuing to move the subsequent frankfurters until each subsequent frankfurter catches up with the frankfurter preceding it at which time that frankfurter is stopped, thus building up a group of frankfurters. While the group is being formed, it is continuously overbalanced until the desired number of frankfurters has been assembled, at which time the balance is overcome and the group is quickly moved from the second path and deposited in a tray forming a part of the package. After the group has been moved away the next frankfurter following those making up the group is stopped at the chosen point along the second path and forms the start of the next group which is assembled in the same manner. While moving the frankfurters along at least one of the paths the frankfurters are rotated so as to expose the entire surface of the frankfurters to a visual inspection. In the embodiment hereinafter described this rotation takes place during the course of the movement of the frankfurters along the second of said paths.

With reference to the drawings, my apparatus comprises, in general, a bed 11 mounted under and attached to frame stanchions 12, 13 of a basket conveyor device 14, and a pair of endless receiving conveyors 15 and 15a positioned beneath the end of processing conveyor 14. Between the processing conveyor 14 and the receiving conveyors 15, 15a is a starwheel 16 for transferring objects from the processing conveyor to the receiving conveyors. A pair of assembling means 17, 17a are positioned adjacent points on the receiving conveyors 15, 15a spaced from the processing conveyor 14; and transfer devices 18, 18a are positioned adjacent the receiving conveyors 15, 15a, opposite the assembling means 17, 17a, for transferring objects from the receiving conveyors to the assembling means. Each assembling means includes a roller conveyor 19 (19a) extending at substantially right angles from the receiving conveyor 15 (15a), a pan 20 (20a) in line with the roller conveyor to hold a desired group of the objects, and a carton supporting member 21 (21a) positioned adjacent and slightly below the pan. A ram 22 (22a) adjacent each pan 20 (20a) at a side opposite the carton supporting member is operable to move a group of objects from the pan onto a carton placed upon the supporting member.

While this apparatus was devised specifically for handling frankfurters, the frankfurter manufacturing machine which is connected to the present apparatus by means of the processing conveyor 14 does not form a part of the present invention, and such apparatus forms part of a separate invention. The processing conveyor 14 consists of a plurality of elongated, open topped baskets 24 fixed between a pair of endless chains 25, 26. Chains 25, 26 extend from the manufacturing machine (not shown) and pass about a pair of gears 27, 28 which are fixed to a shaft 29 supported in bearings on stanchions 12, 13.

Starwheel 16 comprises four longitudinal ribs 31 fixed to a shaft 32 positioned parallel to shaft 29 beneath the line at which the baskets 24 are inverted when passing about gears 27, 28. The shaft 32 is rotatably supported at the lower portions of stanchions 12, 13 (as seen in Fig. 2) to position the starwheel 16 to receive the frankfurters, dumped from succeeding baskets 24, between adjacent ribs 31. In order to insure that all of the frankfurters fall from the baskets 24 to the starwheel 16, a curved chute 33 is pivotally suspended between the stanchions 12, 13 and, when in its normal position, forms a closure about the end of conveyor 14 leading to the starwheel 16. A latch 34 (seen in Fig. 7) is provided to secure the chute 33 in its normal position; however, the latch may be released and the chute 33 swung outwardly to allow frankfurters to fall clear of the starwheel in the event that the machine malfunctions or access to the starwheel is required.

The receiving conveyors 15, 15a are located adjacent and slightly below the level of shaft 32 opposite the chute 33. When the manufacturing machine is in operation, succeeding baskets 24 will pass a given position at intervals, for example, of about four seconds. It is necessary that the receiving conveyors carry the frankfurters from beneath the end of the processing conveyor 14 before the next succeeding basket dumps its load of frankfurters. As may be best seen in Figs. 1 and 2, conveyor 15 is positioned immediately adjacent the starwheel 16 and extends from a point about midway along the length of the starwheel to the assembling means 17. Conveyor 15a (seen in Figs. 1 and 2) is also parallel to the starwheel 16 and is positioned beyond and slightly below the conveyor 15. The conveyor 15a extends parallel to the entire length of starwheel 16 to a point beyond the end of conveyor 15. Both conveyors 15 and 15a consist of a plurality of segments 35, having their conveying surfaces shaped to substantially mate with the contour of the frankfurters, connected end to end in the form of an endless chain. Each chain passes about a pair of sprockets 36, 37 and 36a, 37a which are fixed to axles 38, 39 and 38a, 39a, respectively, journaled in the bed 11. One or more additional idler sprockets 40 may be rotatably mounted to brackets 41, which are pivotally mounted on bed 11, to act as slack adjusters for the lower runs of the conveyors 15, 15a. Preferably a variable speed gear motor 42 is connected to a sprocket 43 (Fig. 8) mounted to the axle 39 by means of a drive chain 44 extending about sprocket 43 and a gear 45 fixed to the motor-shaft. As shown in Figs. 1 and 2, another drive chain 46 extends between a third sprocket 47, fixed to axle 39 and a sprocket 48 fixed to the axle 39a. By this means, both conveyors may be operated at the same speed from a single drive. The variable speed gear motor 42 is controlled by a suitable electrical switch (not shown).

In order to maintain the upper runs of conveyors 15, 15a in a horizontal path parallel to the starwheel 16, a pair of trough-shaped guideways 50 and 50a (Fig. 8), respectively, are secured to the bed 11 to support and guide the undersides of conveyor segments 35. As may be best seen in Fig. 5, the sides of guideways 50 and 50a furthest from the starwheel 16 are extended upwardly above the level of conveyors 15, 15a, to form backstops 51, 51a. The side of guideway 50a, along that portion of the conveyor 15a extending to the left and beyond conveyor 15 (as seen in Figs. 1 and 2), is extended upwardly toward the starwheel 16 to form a ramp 52 between that portion of conveyor 15a and the ribs 31 of starwheel 16.

From the foregoing description and the figures, it will be seen that each succeeding load of frankfurters dropped from baskets 24 should fall between two adjacent ribs 31 of the starwheel 16. The starwheel must be rotated at the proper interval to deliver one load of frankfurters to conveyors 15, 15a, and to receive another load of frankfurters from the next succeeding basket 24. To insure that starwheel 16 rotates properly, a synchronizing mechanism, generally 53 (Fig. 2), is provided to translate the uninterrupted rotation of shaft 29 into intermittent rotation at shaft 32 (and the starwheel 16). The end of shaft 29 extending through stanchion 12 terminates in the form of a toothed jaw 54 (Fig. 6). Another smaller shaft 55 extending in line with shaft 29 is journalled in a pair of vertical chassis plates 56, 57, which are mounted on the bed 11 at the left of stanchion 12 (as seen in Figs. 1 and 2). The shaft 55 is connected to shaft 29 by means of a jaw 58, which is adapted to mate with the jaw 54. Jaw 58 is mounted for sliding movement lengthwise of shaft 55 while rotation between the shaft and jaw is prevented by splines 59, on the end of shaft 55, which fit into grooves (not shown) formed internally on jaw 58. A compression spring 60, concentric with shaft 55 and extending between vertical chassis plate 57 and the jaw 58, normally urges the jaw into engagement with jaw 54 on shaft 29. Concentrically mounted on shaft 55 between the vertical chassis plates 56, 57 is a disk 61. A plurality of cam lugs 62 (Fig. 5) are secured to the vertical surface of disk 61 near its periphery and extend toward the vertical chassis plate 57. The angular displacement of the cam lugs 62 on disk 61 corresponds to the angular displacement, as measured from the center of shaft 29, between baskets 24 as they pass about gears 27, 28. Another shaft 63 is journalled in chassis plate 57 below shaft 55. A starwheel 64, comprising five radially extending arms 65, is fixed to shaft 63 at a position allowing intermittent contact between successive cam lugs 62 and starwheel arms 65 when the disk 61 is rotating. Also secured to shaft 63 on the side of chassis plate 57 opposite starwheel 64 is a sprocket 66. The sprocket 66 is connected to a smaller sprocket 67 which is fixed to the starwheel shaft 32, by means of a drive chain 68. When the processing conveyor 14 is in operation and jaws 58 and 54 engaged, the shaft 55 will turn the disk 61. Due to equal angular displacement of the cam lugs 62 on the disk 61 as compared to the baskets 24, the starwheel 64 will be turned intermittently as succeeding baskets pass about gears 27, 28 and thus cause rotation of the starwheel 16.

In the event of malfunction, or for maintenance purposes, it is sometimes necessary to stop the starwheel 16 and divert the frankfurters from the machine. For this purpose, jaw 58 has been made slidable on shaft 55. The jaw 58 has a peripheral groove 70 circling its body as best seen in Fig. 6. A horizontal plate 71 is welded to stanchion 12 and extends to the left toward chassis plate 57. Pivotally mounted on the plate 71 by a pin 72 is an arm generally 73 (Fig. 5). One end of the arm 73 is bifurcated to form a yoke 74 about jaw 58, and each end of the yoke 74 carries a cam follower 75 adapted to fit in groove 70 on the jaw 58. The opposite end of arm 73 is in the form of a handle 76 and carries a locking pin 77 adapted to be inserted in a seat 78 on the plate 71 when the yoke 74 is pivoted away from stanchion 12. By this means the arm 73 may be pivoted to overcome the force of spring 60, thereby withdrawing jaw 58 from engagement with jaw 54 and stopping the rotation of starwheel 16.

It is necessary that the starwheel 16 be rotated one-quarter turn for each succeeding basket. Since starwheel 64 has five arms 65 and will be turned one-fifth of a rotation by each succeeding cam lug 62, the sprockets 66 and 67 will be selected to have diameters in the ratio of 5 to 4 respectively. Due to the distance between succeeding cam lugs 62 as compared to the length of arms 65 on starwheel 64 the starwheel 64 (and therefore the starwheel 16) will be intermittently rotated. It has been found desirable, in this apparatus where a basket 24 is dumped every four seconds, to have the starwheel dwell for a period of about 2½ seconds, beginning at a time just before the frankfurters are dumped from a basket, and to accomplish the rotation of the starwheel in the remaining one and one-half seconds before the next succeeding basket is in a position to dump its frankfurters. The relationship of the periods of dwell and rotation depends upon the length of the starwheel arms 65 and the distance between the center of shaft 63 and the circular path described by the cam lugs 62.

In order to assure that the starwheel 16 will turn in accurate increments of 90° a four point lobular cam 79 is fixed to the starwheel shaft 32 between the sprocket 67 and the starwheel 16. Pivotally attached to stanchion 12 by a pin 80 is a lever 81. Rotatably attached to one end of lever 81 is a cam follower 82 which rides along the peripheral surface of the lobular cam 79. A tension spring 83, moored to the stanchion 12 above the lever 81, is connected to the end of the lever opposite the cam follower 82. The position of the cam 79 on shaft 32 is such that when the starwheel is at a position of dwell, the cam follower 82 will rest in a depressed area along the surface of the cam. Thus, the cam follower will tend to positively stop rotation of the starwheel every quarter turn.

The assembling means 17, 17a, which are connected to the receiving conveyors 15, 15a, respectively, are substantially identical. Therefore, only the apparatus associated with conveyor 15 will be described in detail, it being understood that like parts of similar apparatus associated with conveyor 15a will be denoted by the same reference characters bearing the subscript "a" in the various figures.

The roller conveyor 19 extends from a point slightly below and near the right end of the upper run of conveyor 15 (as seen in Fig. 2) and is substantially perpendicular thereto. The transfer device 18 is mounted within a frame 86 (Fig. 8) fixed to the edge of bed 11 just above the upper run of conveyor 15 opposite the roller conveyor 19. A solenoid 87 is connected to one end of the frame 86 and an armature 88 is connected to the opposite end of the frame by means of a tension spring 89. On frame 86 below the armature 88 is a pin 90 to which a kick finger 91 is pivotally connected. The upper end of the kick finger 91 contains a slot 92 and is slidingly connected thereby to a pin 93 on the armature 88. The opposite end of kick finger 91 terminates in a curved engaging wand 94 which extends a distance sufficient to intercept a frankfurter on conveyor 15. As indicated in Fig. 8, the transfer device 18 is oriented so that the engaging wand 94 may be moved in an arc generally perpendicular to, and intercepting the path of a frankfurter on conveyor 15. Positioned in the path of frankfurters carried on the conveyor 15, at a point beyond the arc in which engaging wand 94 will travel, is a sensing element 95. This sensing element is spaced a distance less than the length of a frankfurter from the engaging wand 94, and is connected directly to a snap switch 96 which operates to close or break an electrical circuit connecting the solenoid 87 to a source of electric current. When a frankfurter is moved against the sensing element 95, the snap switch 96 will be moved to close the electrical circuit and the solenoid 87 will be energized. Armature 88 will then be attracted toward the solenoid and will cause the kick finger 91 to pivot about pin 90 and swing the engaging wand 94 into contact with the frankfurter at about its midsection. Kick finger 91 will move the frankfurter from conveyor 15 in a direction toward the roller conveyor 19. When the frankfurter is moved from conveyor 15, releasing the sensing element 95, snap switch 96 will open and solenoid 87 will be deenergized. Tension spring 89 will then withdraw the armature 88 from the solenoid 87 moving the kick finger 91 and engaging wand 94 counter clockwise (as seen in Fig. 8). Suitable means, such as a threaded stud 97 may be provided to enable adjustment of the tension on the spring 89. Also, it is desirable to provide a motion dampener curtain 98 (as seen in Fig. 8) to control the frankfurter when kicked from conveyor 15. The curtain 98 may consist of a rectangular sheet of any suitable material, such as light guage metal, or plastic, and is pivotally suspended between a pair of cantilever arms 99 above the roller conveyor 19, parallel to conveyor 15. The cantilever arms 99 are secured to the bed 11 on either side of the transfer device frame 86.

The roller conveyor 19 consists of a plurality of cylindrical rollers 103 rotatably suspended between a pair of endless chains 104, 105 and spaced at intervals so that the distance between opposing surfaces of succeeding rollers will be less than the diameter of a frankfurter. Each of the chains 104 and 105 pass about a pair of sprockets 106, 107, and 108, 109 respectively. Sprockets 106 and 108 are fixed to a common axle 110 oriented parallel to the conveyor 15 and journalled in a pair of bearings 111, 112 which are secured to either an extension of bed 11 or an adjacent table 114 (seen in Fig. 4). Sprockets 107, 109 are similarly fixed to an axle 115 journalled in bearings 116, 117. As may be seen in Fig. 3, axle 115 extends beyond the conveyor 19 and beneath the other second conveyor 19a. A drive chain 118 connects a sprocket 119, fixed to the end of axle 115, and a similar sprocket 120 fixed to axle 115a (part of conveyor 19a). An electric motor 122 is connected to the axle 115 by means of a drive chain 123 passing about a gear 124 on the motor shaft and a similar gear 125 fixed to the axle 115 between the conveyors 19, 19a. The motor is connected to a suitable source of electric current and may be controlled by a suitable switch (not shown). Axle 115 therefore serves to transmit motion to both conveyors 19 and 19a.

The conveyor 19 is operated so that its upper run travels away from conveyor 15. A pad 126 is positioned immediately beneath the upper run of conveyor 19 in contact with the under surfaces of rollers 103. As the rollers are rotatably carried by the chains 104, 105 they will be caused to revolve clockwise, as seen in Fig. 4, when they are rolled across pad 126. Also, a fence 127, which may consist of a long rectangular piece of sheet metal or plastic, is located just above the upper run of conveyor 19 and extends from a point approximately above sprocket 108 to a point further along the conveyor 19 between the chains 104 and 105. Each frankfurter, when kicked from conveyor 15, will fall between two successive rollers 103. The motion dampener curtain 98 assists in maintaining the alignment of the frankfurters so they will fall accurately and will not land askew the rollers 103. While the leading end of the frankfurters should normally fall in alignment on conveyor 19, since the sensing element 95 will signal the actuation of kick finger 91 when succeeding frankfurters reach approximately the same point on conveyor 15, the fence 127 will positively align the ends of frankfurters on conveyor 19 for subsequent operations.

Figure 3:
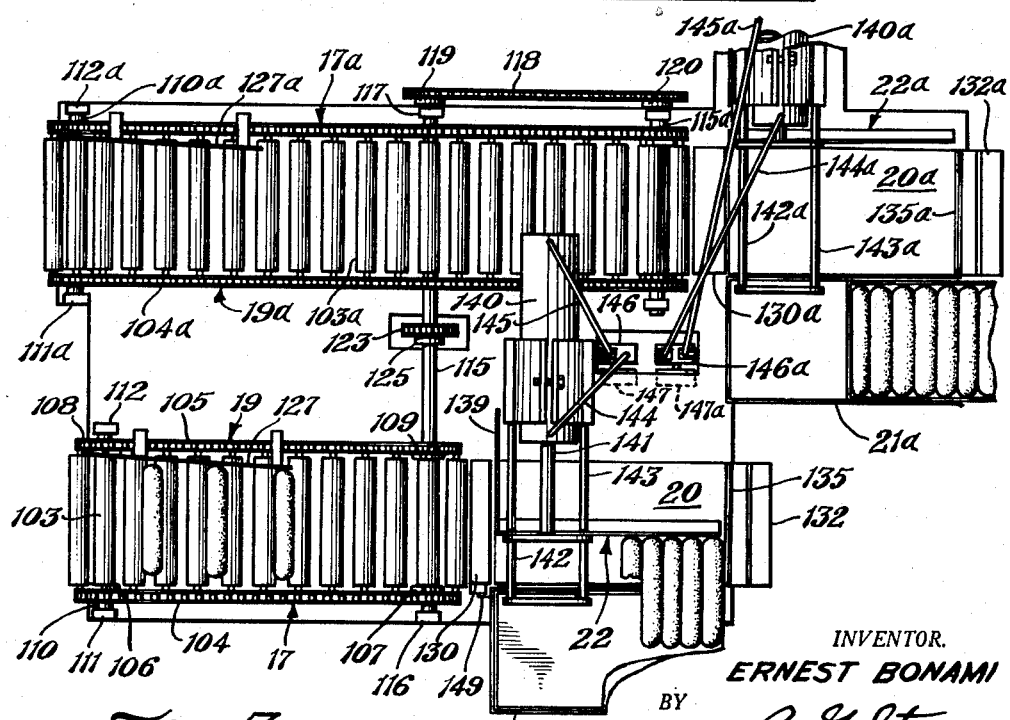
Figure 3 is a plan view, on an enlarged scale, of the roller conveyors and grouping and carton filling mechanism.

Extending immediately beyond and in line with conveyor 18 is a collector plate 130 (Figs. 3 and 4). The collector plate 130 is slightly inclined downwardly away from the upper run of the conveyor 19. Beyond the plate, opposite the conveyor, is pan 20 which receives a desired group of frankfurters. This pan 20 is pivotally supported upon a fulcrum 131 and counterbalanced at the right end (as seen in Fig. 4) by a weight 132. Suitable stops (not shown) prevent the left end of pan 20 from moving upwardly beyond the level of collector plate 130. A two-way snap switch 133 is positioned directly beneath pan 20 near the collector plate 130. The snap switch 133 is normally open, and is closed by pan 20 when it is loaded with the desired number of frankfurters. A stop member 134 is positioned on table 114 immediately adjacent the collector plate 130 to arrest the downward swing of the pan 20 when it assumes a horizontal attitude. A stop rail 135 is fixed transversely across the pan 20 directly above fulcrum 131. The counter-balanced weight 132 is positioned to the right of fulcrum 131 on pan 20 (as seen in Fig. 4) and is of a size just sufficient to counteract the total counter-clockwise moment, about fulcrum 131, that will be caused by one less than the desired number of frankfurters on pan 20.

As may be seen in Fig. 3, the carton supporting member 21 is positioned adjacent a side of pan 20. The transfer ram 22 is located adjacent the opposite side of the pan having a ram face 138 parallel to the pan and extending the distance between the collector plate 130 and the stop rail 135. An interceptor plate 139 extends rearwardly from the end of ram face 138 adjacent collector plate 130. The ram 22 is connected to a piston (not shown) within an air cylinder 140 by piston rod 141. Ram 22 is also slidably connected to guide rods 142, 143 which extend from the face of the air cylinder. A pair of airlines 144, 145 connect the forward end and the rear end, respectively of air cylinder 140 to a four-way valve 146 which is in communication with a source of air under a pressure of about 25 p.s.i. The four-way valve 146 is also in communication with the atmosphere. An electrical actuator 147 is directly connected to the four-way valve 146 to enable operation of the valve to direct air under pressure to either of the air lines 144 or 145, while connecting the other to the atmosphere. Snap switch 133 is in series with a source of electrical power and actuator 147, and when closed causes the actuator to operate the four-way valve 146 to direct air under pressure through air line 145 to the rear end of air cylinder 140. Thus ram 22 will be moved across pan 20. When the ram reaches the opposite side of pan 20, it will close another snap switch 149. Snap switch 149 is also in series with a source of electrical power and actuator 147 and when closed will cause the actuator 147 to operate the four-way valve 146 to direct the air under pressure through airline 144 to the forward end of the air cylinder. When the forward end of air cylinder 140 is under pressure the piston therein will reverse its motion and ram 22 will be returned to its first position adjacent the pan 20. When the ram 22 is in its extended position, the interceptor plate 139 will block the frankfurters causing them to be held on collector plate 130. Also the interceptor plate 139 will hold the pan 20 in its horizontal attitude until the ram has returned to its first position. At that time, the pan 20 will be released to swing upwardly and receive frankfurters from the collector plate 130.

It will be readily apparent that it is advantageous to have a relatively higher pressure air introduced to the forward end of air cylinder 140 as compared to the rear end. This enables a faster return of the ram 22 as compared to the speed of the ram when moving frankfurters from the pan 20. To facilitate this action, a throttling valve 150 is placed in air line 145, between the four-way valve 146 and the rear of cylinder 140. The effect of the throttling valve 150 is to reduce the air pressure at the rear of cylinder 140 to approximately 15 p.s.i. A short length of tubing 151 is provided in airline 145 to bypass the throttling valve 150; and a one-way check valve 152 is placed in the bypass line 151. The check valve 152 will open to allow air to flow only from the cylinder 140 back to the four-way valve 146. Therefore, when the rear of cylinder 140 is connected to the source of high pressure air through airline 145 the throttling valve 150 will reduce the pressure from 25 p.s.i. to approximately 15 p.s.i. and check valve 152 will remain closed. However, when air at 25 p.s.i. is introduced to the forward end of the air cylinder 140, it will force the piston to reverse its motion. At the same time line 145 will be connected to the atmosphere and air from the rear of cylinder 140 will be rapidly exhausted through the check valve 152.

In the operation of my machine, the receiving conveyors 15, 15a are run continuously by keeping variable speed motor 42 energized. Similarly the roller conveyors 19, 19a are continuously operated by energizing gear head motor 122. When these conveyors are moving, the synchronizing mechanism 53 is operated to intermittently rotate the starwheel 16 by releasing the locking pin 77 to allow arm 73 to move clockwise to engage the jaw 58 with jaw 54 on the shaft 29 of the processing conveyor 14. In this manner the starwheel 16 will be rotated one quarter turn after each basket 24 dumps its load of frankfurters. Usually each basket contains about eight frankfurters spread substantially throughout its length. When a basket is inverted, as it passes about the gears 27, 28 these frankfurters will fall and slide down the chute 33 into axial alignment along the length of the starwheel between two adjacent ribs 31. When the starwheel is rotated those frankfurters will roll from the ribs onto the receiving conveyors 15, 15a. Meanwhile the starwheel assumes a position ready to receive another load of frankfurters from the next succeeding basket 24.

Approximately half of each load of frankfurters will roll from the starwheel to each of the receiving conveyors 15 and 15a. Part will roll directly onto the shaped surface segments of conveyor 15, while the remainder will roll or slide across the ramp 52 onto conveyor 15a. The receiving conveyors move at a speed sufficient to clear the area adjacent the starwheel within about four seconds, or before the next load of frankfurters will be received. Preferably, the speed is such that nearly continuous succession of frankfurters is carried on the conveyors 15, 15a.

At a point along the receiving conveyors beyond the starwheel, each successive frankfurter will trip a sensing element 95 which signals the actuation of the transfer device 18. Therefore, at essentially the same point along the receiving conveyors 15, 15a, each successive frankfurter will be engaged by a wand 94 and ejected from that conveyor onto the roller conveyor 19. The movement of each frankfurter is controlled so that it will fall between two rollers 103; and the fence 127 will insure accurate alignment of the forward end of frankfurters on the roller conveyor. The rollers 103 are constantly revolving as they are being rolled across the pad 116. Therefore, the frankfurters carried between the rollers will be rotated and an operator, standing nearby, may visually inspect the entire surface of each frankfurter and remove any defective product.

When the frankfurters reach the end of the roller conveyor they are deposited upon the inclined collector plate 130 and are free to roll onto pan 20 when the pan is not fully loaded. However, when the desired number of frankfurters are on the pan the total weight of the frankfurters thereon will overbalance the counter weight 132 and cause the pan to pivot and trip a switch 133. This causes air under pressure to be directed to the rear end of cylinder 140 and the ram 22 will be forced across the surface of the pan 20 to move the frankfurters onto a carton placed upon the support member 21. Obviously the carton may be positioned automatically or by hand, and when loaded may be removed in either manner. Interceptor plate 139 will be moved between the collector plate and the pan as the ram is extended. Thus, the flow of frankfurters from the roller conveyor to the pan will be momentarily blocked until the ram is withdrawn. The ram 22 is automatically reversed and withdrawn when it has moved completely across the pan 20. This is accomplished when the fully extended ram trips another switch 149 which causes air under pressure to be directed to the forward end of the air cylinder 140.

As previously indicated, the operation of my apparatus may be stopped by disconnecting jaw 58 from jaw 54. If this is done while the frankfurter manufacturing machine and the processing conveyor 14 continue to function, it is necessary to divert the frankfurters, dumped from the baskets 24, from the starwheel 16. This is accomplished simply by releasing the latch 34 and swinging the chute 33 (which forms a closure about the end of the processing conveyor and the starwheel when closed) away from the starwheel. The frankfurters will then fall, from the baskets, clear of the starwheel and may be collected in baskets, or the like, below the apparatus.

Obviously, many modifications and variations of the invention as hereinbefore set forth may be made without departing from the spirit and scope thereof, and therefore only such limitations should be imposed as are indicated in the appended claims.

I claim:

1. The method of assemblying a group from a plurality of generally cylindrical objects moving along a conveyor in a given direction, said method comprising positioning said objects in sequential order end to end with their cylindrical axes in alignment, moving said objects along a path so aligned, at a point in said path moving each object as it arrives at said point at substantially right angles along a second path while maintaining the angular position of each object to obtain a stream of objects in spaced side by side relationship, rotating said objects about their axes while moving along said second path to permit visual inspection of the entire cylindrical surface of said objects, stopping one of said objects at a point along said second path and continuing to move the following objects until each reaches the preceding object, weighing the stopped objects until a weight indicative of a group is reached to form a group, pushing against one end of each object of said group only upon said weight being reached to move said group along the cylindrical axes of said objects out of said second path, and stopping the objects following said group commencing with the next subsequent object to arrive at said point.

2. The method of assembling a group from a plurality of generally cylindrical objects moving along a conveyor in a given direction and placing the group in a carton, said method comprising positioning said objects in sequential order end to end with their cylindrical axes in alignment, moving said objects along a path so aligned, at a point in said path moving each object as it arrives at said point at substantially right angles along a second path while maintaining the angular position of each object to obtain a stream of objects in spaced side by side relationship, rotating said objects while they are moving along one of said paths to permit the visual inspection of the periphery of said objects, stopping one of said objects at a point along said second path and continuing to move the following objects until each reaches the preceding object, weighing the stopped objects until a weight indicative of a group is reached to form a group, positioning a carton to one side of and below said group, pushing against one end of each object of said group only upon said weight being reached to move said group along the cylindrical axes of said objects out of said second path into said carton, and stopping the objects following said group commencing with the next subsequent object to arrive at said point.

3. An apparatus for assembling a plurality of cylindrical objects moving in a given direction, said objects having their cylindrical axes generally parallel and transverse to said direction on a conveyor having a turn reverse to said direction along a line at which said objects will fall from said conveyor, said apparatus including an endless means trained for movement along a path a portion of which is adjacent and generally parallel to said line, said endless means having the outer face thereof generally concave in cross section to form an elongated concave conveying surface, transfer means positioned along said line and adjacent said portion of said path to receive said objects falling from said conveyor and deposit them on said endless means, a kicker adjacent another portion of said path to push objects at said other portion from said endless means, sensing means connected to said kicker to actuate said kicker when an object is at said other portion of said path, and means adjacent said other portion of said path to receive objects pushed from said endless means by said kicker and to assemble said objects into a group with said objects positioned side by side with their axes generally parallel and the ends of the objects in alignment.

4. An apparatus for assembling a plurality of cylindrical objects moving in a given direction in timed groups of objects having their cylindrical axes generally parallel and transverse to said direction on a conveyor having a turn reverse to said direction along a line at which said groups will fall from said conveyor at given intervals of time, said apparatus including an endless means trained for movement along a path a portion of which is adjacent and generally parallel to said line, transfer means including a starwheel along said portion of said path and said line to receive each group from said conveyor, said starwheel being rotatably mounted, means to rotate said starwheel after each of said intervals of time to transfer each group of objects received from said conveyor to said endless means, said endless means having the outer face thereof generally concave in cross section to form an elongated concave conveying surface, power means connected to said endless means to move each group from said portion of said path in said interval, a kicker adjacent another portion of said path to push objects at said other portion from said endless means, sensing means connected to said kicker to actuate said kicker when an object is at said other portion of said path, and means adjacent said other portion of said path to receive objects from said endless means.

5. An apparatus for assembling a plurality of generally cylindrical objects moving along a conveyor in a given direction, said apparatus including a receiving conveyor positioned at a point along the first mentioned conveyor to move said objects along a path transverse to said direction, means associated with the two conveyors to take said objects from the first conveyor and transfer said objects to said receiving conveyor with said objects aligned on said receiving conveyor in end to end relationship with their axes parallel to said path, a pair of spaced endless means positioned in parallel paths extending away from a pair of spaced points along said second conveyor to a terminus, a plurality of rollers rotatably connected to said endless means and extending therebetween, said rollers being positioned so that the space therebetween is less than the diameter of said objects, means along said receiving conveyor between said points to move said objects from said receiving conveyor to said rollers, power means connected to said endless means to move said rollers away from said receiving conveyor, means associated with said rollers to rotate said rollers, and means adjacent said rollers at said terminus to assemble said objects into a group with said objects positioned side by side with their axes generally parallel and the ends of the objects in alignment.

6. An apparatus for assembling a plurality of cylindrical objects moving in a given direction, said objects having their cylindrical axes generally parallel and transverse to said direction on a conveyor having a turn reverse to said direction along a line at which said objects will fall from said conveyor, said apparatus including a first endless means trained for movement along a path a portion of which is adjacent and generally parallel to said line, said endless means having the outer face thereof generally concave in cross section to form an elongated concave conveying surface, transfer means positioned along said line and adjacent said portion of said path to receive said objects falling from said conveyor and deposit them on said endless means, a kicker adjacent another portion of said path to push objects at said other portion from said endless means, sensing means connected to said kicker to actuate said kicker when an object is at said other portion of said path, a pair of spaced endless means positioned in parallel paths extending away from a pair of spaced points along said other portion of said first endless means to a terminus, a plurality of rollers rotatably connected to said spaced endless means and extending therebetween, said rollers being positioned so that the space therebetween is less than the diameter of said objects, power means connected to said spaced endless means to move said rollers away from said first endless means, and means associated with said rollers to rotate said rollers.

7. An apparatus for assembling a plurality of cylindrical objects moving in a given direction in timed groups of objects having their cylindrical axes generally parallel and transverse to said direction on a conveyor having a turn reverse to said direction along a line at which said groups will fall from said conveyor at given intervals of time, said apparatus including a first endless means trained for movement along a path a portion of which is adjacent and generally parallel to said line, transfer means including a starwheel along said portion of said path and said line to receive each group from said conveyor, said starwheel being rotatably mounted, means to rotate said starwheel after each of said intervals of time to transfer each group of objects received from said conveyor to said endless means, said endless means having the outer face thereof generally concave in cross section to form an elongated concave conveying surface, power means connected to said endless means to move each group from said portion in said time interval, a kicker adjacent another portion of said path to push objects at said other portion from said endless means, sensing means connected to said kicker to actuate said kicker when an object is at said other portion of said path, a pair of spaced endless means positioned in parallel paths extending away from a pair of spaced points along said other portion of said first endless means to a terminus, a plurality of rollers rotatably connected to said spaced endless means and extending therebetween, said rollers being positioned so that the space therebetween is less than the diameter of said objects, and power means connected to said spaced endless means to move said rollers away from said second conveyor.

8. An apparatus for assembling a plurality of generally cylindrical objects moving along a conveyor in a given direction and for putting said objects in a carton, said apparatus including a receiving conveyor positioned at a point along the first mentioned conveyor to move said objects along a path transverse to said direction, means associated with the two conveyors to take said objects from the first conveyor and transfer said objects to said receiving conveyor with said objects aligned sequentially along said path, means associated with said receiving conveyor to assemble said objects into a group with said objects positioned side by side with their axes generally parallel and the ends of the objects in alignment, the last mentioned means including a scale pan to which said objects are delivered, a counterbalance means attached to said pan to normally incline it upwardly toward the end at which said objects are delivered and sufficiently heavy to permit said pan to tilt down to a level position only after a given number of said objects are on said pan, means to position a carton to one side of and below said pan in the level position, a pusher at the opposite side of said pan and movable across the pan to move the objects thereon to said carton, and means connected to said pusher and actuated by said pan moving downwardly to move said pusher across said pan.

9. An apparatus for assembling a plurality of generally cylindrical objects moving along a conveyor in a given direction, said apparatus including a receiving conveyor positioned at a point along the first mentioned conveyor to move said objects along a path transverse to said direction, means associated with the two conveyors to take said objects from the first conveyor and transfer said objects to said receiving conveyor with said objects aligned on said receiving conveyor in end to end relationship with their axes parallel to said path, a pair of spaced endless means positioned in parallel paths extending away from a pair of spaced points along said receiving conveyor to a terminus, a plurality of rollers rotatably connected to said endless means and extending therebetween, said rollers being positioned so that the space therebetween is less than the diameter of said objects, means along said receiving conveyor between said points to move said objects from said receiving conveyor to said rollers, power means connected to said endless means to move said rollers away from said receiving conveyor, means adjacent said rollers at said terminus to assemble said objects into a group with said objects positioned side by side with their axes generally parallel and the ends of the objects in alignment, the last mentioned means including a scale pan to which said objects are delivered, a counterbalance means attached to said pan to normally incline it upwardly toward the end at which said objects are delivered and sufficiently heavy to permit said pan to tilt down to a level position only after a given number of said objects are on said pan, means to position a carton to one side of and below said pan in the level position, a pusher at the opposite side of said pan and movable across the pan to move the objects thereon to said carton, and means connected to said pusher and actuated by said pan moving downwardly to move said pusher across said pan.

10. An apparatus for assembling a plurality of cylindrical objects moving in a given direction in timed groups of objects having their cylindrical axes generally parallel and transverse to said direction on a conveyor having a turn reverse to said direction along a line at which said groups will fall from said conveyor at given intervals of time, said apparatus including a first endless means trained for movement along a path a portion of which is adjacent and generally parallel to said line, transfer means including a starwheel along said portion of said path and said line to receive each group from said conveyor, said starwheel being rotatably mounted, means to rotate said starwheel after each of said time intervals, to transfer each group of objects received from said conveyor to said endless means, said endless means having the outer face thereof generally concave in cross section to form an elongated concave conveying surface, power means connected to said endless means to move each group from said portion in said time interval, a kicker adjacent another portion of said path to push objects at said other portion from said endless means, sensing means connected to said kicker to actuate said kicker when an object is at said other portion of said path, a pair of spaced endless means positioned in parallel paths extending away from a pair of spaced points along said other portion of said first endless means to a terminus, a plurality of rollers rotatably connected to said spaced endless means and extending therebetween, said rollers being positioned so that the space therebetween is less than the diameter of said objects, power means connected to said endless means to move said rollers away from said first endless means, means adjacent said rollers at said terminus to assemble said objects into a group with said objects positioned side by side with their axes generally parallel and the ends of the objects in alignment, the last mentioned means including a scale pan to which said objects are delivered, a counterbalance means attached to said pan to normally incline it upwardly toward the end at which said objects are delivered, and sufficiently heavy to permit said pan to tilt down to a level position only after a given number of said objects are on said pan, means to position a carton to one side of and below said pan in a level position, a pusher at the opposite side of said pan and movable across the pan to move the objects thereon to said carton, and means connected to said pusher and actuated by said pan moving downwardly to move said pusher across said pan.

11. An apparatus for assembling a plurality of generally cylindrical objects, said apparatus including a pair of spaced endless means positioned in parallel paths extending away from a pair of spaced points to a terminus, a plurality of rollers rotatably connected to said endless means and extending therebetween, said rollers being positioned so that the space therebetween is less than the diameter of said objects, means between said points to move said objects onto said rollers between said points, power means connected to said endless means, to move said rollers away from between said points, means associated with said rollers to rotate said rollers, means adjacent said rollers at said terminus to assemble said objects into a group with said objects positioned side by side with their axes generally parallel and the ends of the objects in alignment, the last mentioned means including a scale pan to which said objects are delivered, a counterbalance means attached to said pan to normally incline it upwardly toward the end at which said objects are delivered and sufficiently heavy to permit said pan to tilt down to a level position only after a given number of said objects are on said pan, means to position a carton to one side of and below said pan in the level position, a pusher at the opposite side of said pan and movable across the pan to move the objects thereon to said carton, and means connected to said pusher and actuated by said pan moving downwardly to move said pusher across said pan.

12. An apparatus for assembling a plurality of generally cylindrical objects moving along a conveyor in a given direction, said apparatus including a receiving conveyor positioned at a point along the first mentioned conveyor to move said objects along a path transverse to said direction, means associated with the two conveyors to take said objects from the first conveyor and transfer said objects to said receiving conveyor with said objects aligned on said receiving conveyor in end-to-end relationship with their axes parallel to said path, endless means extending away from a location along said second conveyor to a terminus, a plurality of rollers rotatably supported on said endless means with the axes of said rollers substantially transverse to said endless means, said rollers being positioned so that the space therebetween is less than the diameter of said objects, means along said receiving conveyor at said location to move said objects from said receiving conveyor to said rollers, power means connected to said endless means to move said rollers away from said receiving conveyor, means associated with said rollers to rotate said rollers, and means adjacent said rollers at said terminus to assemble said objects into a group with said objects positioned side by side with their axes generally parallel and the ends of the objects in alignment.

13. An apparatus for assembling a plurality of cylindrical objects moving in a given direction, said objects having their cylindrical axes generally parallel and transverse to said direction on a conveyor having a turn reverse to said direction along a line at which said objects will fall from said conveyor, said apparatus including a first endless means trained for movement along a path a portion of which is adjacent and generally parallel to said line, said endless means having the outer face thereof generally concave in cross section to form an elongated concave conveying surface, transfer means positioned along said line and adjacent said portion of said path to receive said objects falling from said conveyor and deposit them on said endless means, a kicker adjacent another portion of said path to push objects at said other portion from said endless means, sensing means connected to said kicker to actuate said kicker when an object is at said other portion of said path, a second endless means extending away from said other portion to a terminus in the direction said objects are pushed from said first endless means, a plurality of rollers rotatably supported on said second endless means with their axes positioned substantially transverse to said direction, said rollers being positioned so that the space therebetween is less than the diameter of said objects, power means connected to said second endless means to move said rollers away from said first endless means, and means associated with said rollers to rotate said rollers.

14. An apparatus for assembling a plurality of generally cylindrical objects moving along a conveyor in a given direction, said apparatus including a receiving conveyor positioned at a point along the first mentioned conveyor to move said objects along a path transverse to said direction, means associated with the two conveyors to take said objects from the first conveyor and transfer said objects to said receiving conveyor with said objects aligned on said receiving conveyor in end-to-end relationship with their axes parallel to said path, an endless means extending away from a location along said receiving conveyor to a terminus, a plurality of rollers rotatably supported on said endless means each substantially parallel to said path, said rollers being positioned so that the space therebetween is less than the diameter of said objects, means along said receiving conveyor at said location to move said objects from said receiving conveyor to said rollers, power means connected to said endless means to move said rollers away from said receiving conveyor, means adjacent said rollers at said terminus to assemble said objects into a group with said objects positioned side by side with their axes generally parallel and the ends of the objects in alignment, the last mentioned means including a scale pan to which said objects are delivered, a counterbalance means attached to said pan to normally incline it upwardly toward the end at which said objects are delivered and sufficiently heavy to permit said pan to tilt down to a level position only after a given number of said objects are on said pan, means to position a carton to one side of and below said pan in the level position, a pusher at the opposite side of said pan and movable across the pan to move the objects thereon to said carton, and means connected to said pusher and actuated by said pan moving downwardly to move said pusher across said pan.

15. An apparatus for assembling a plurality of generally cylindrical objects, said apparatus including an endless means extending in a direction away from a location to a terminus, a plurality of rollers rotatably supported on said endless means with their axes substantially transverse to said direction, said rollers being positioned so that the space therebetween is less than the diameter of said objects, means at said location to move said objects onto said rollers, power means connected to said endless means to move said rollers away from said location, means associated with said rollers to rotate said rollers, means adjacent said rollers at said terminus to assemble said objects into a group with said objects positioned side by side with their axes generally parallel and the ends of the objects in alignment, the last mentioned means including a scale pan to which said objects are delivered, a counterbalance means attached to said pan to normally incline it upwardly toward the end at which said objects are delivered and sufficiently heavy to permit said pan to tilt down to a level position only after a given number of said objects are on said pan, means to position a carton to one side of and below said pan in the level position, a pusher at the opposite side of said pan and movable across the pan to move the objects thereon to said carton, and means connected to said pusher and actuated by said pan moving downwardly to move said pusher across said pan.

References Cited in the file of this patent

UNITED STATES PATENTS

| | | |
|---|---|---|
| 1,507,387 | Kyler | Sept. 2, 1924 |
| 1,606,834 | Halank | Nov. 16, 1926 |
| 1,824,413 | Stein | Sept. 22, 1931 |
| 1,881,895 | Olson | Oct. 11, 1932 |
| 1,997,532 | Molins | Apr. 9, 1935 |
| 2,158,844 | Harker | Apr. 18, 1939 |
| 2,183,163 | Howard | Dec. 12, 1939 |
| 2,268,803 | Cowl | Jan. 6, 1942 |
| 2,633,280 | Davis | Mar. 31, 1953 |
| 2,717,086 | Bush | Sept. 6, 1955 |
| 2,768,756 | Horman | Oct. 30, 1956 |
| 2,838,161 | Page et al. | June 10, 1958 |

FOREIGN PATENTS

| | | |
|---|---|---|
| 395,029 | Great Britain | July 13, 1933 |